Patented Jan. 31, 1950

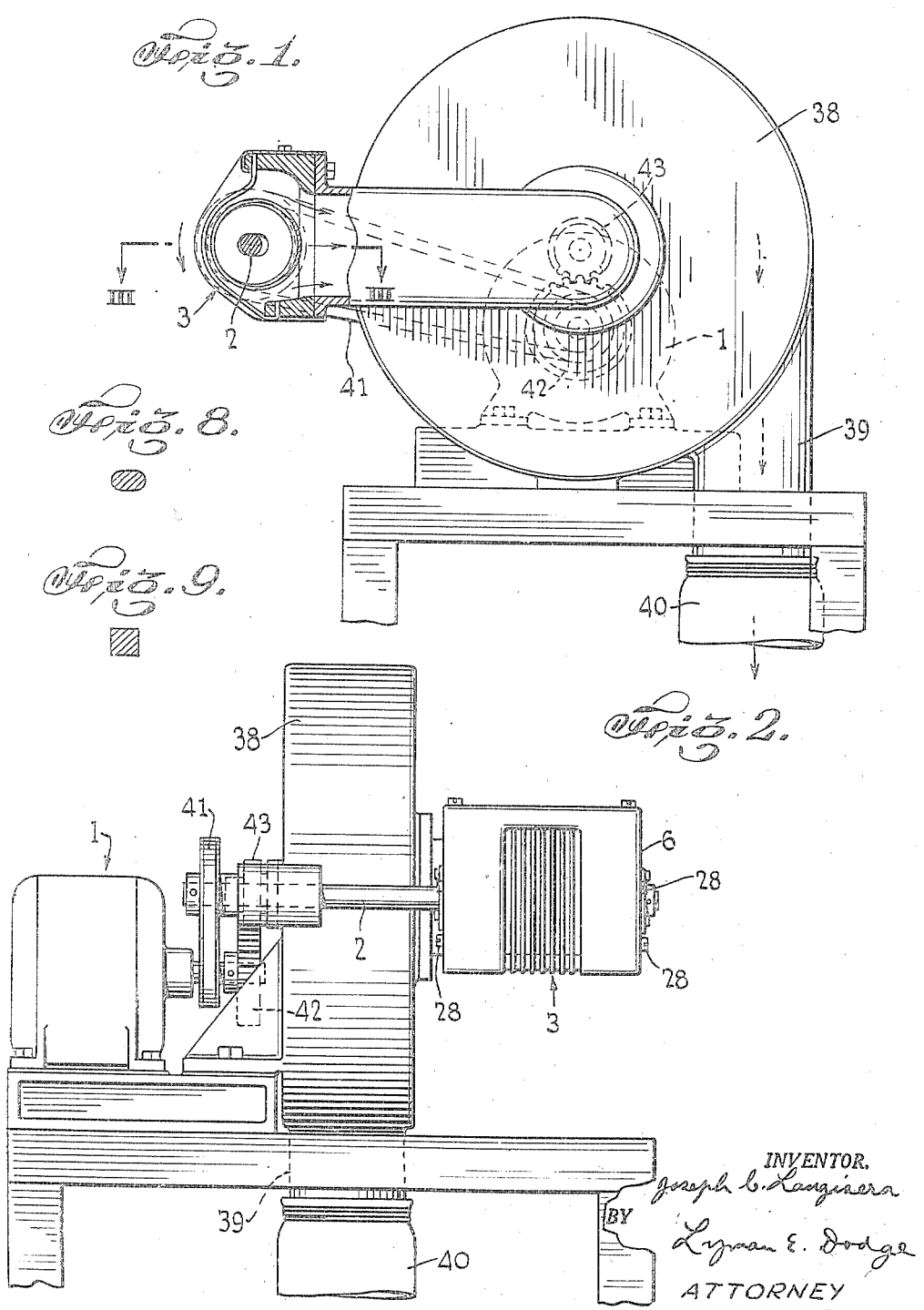

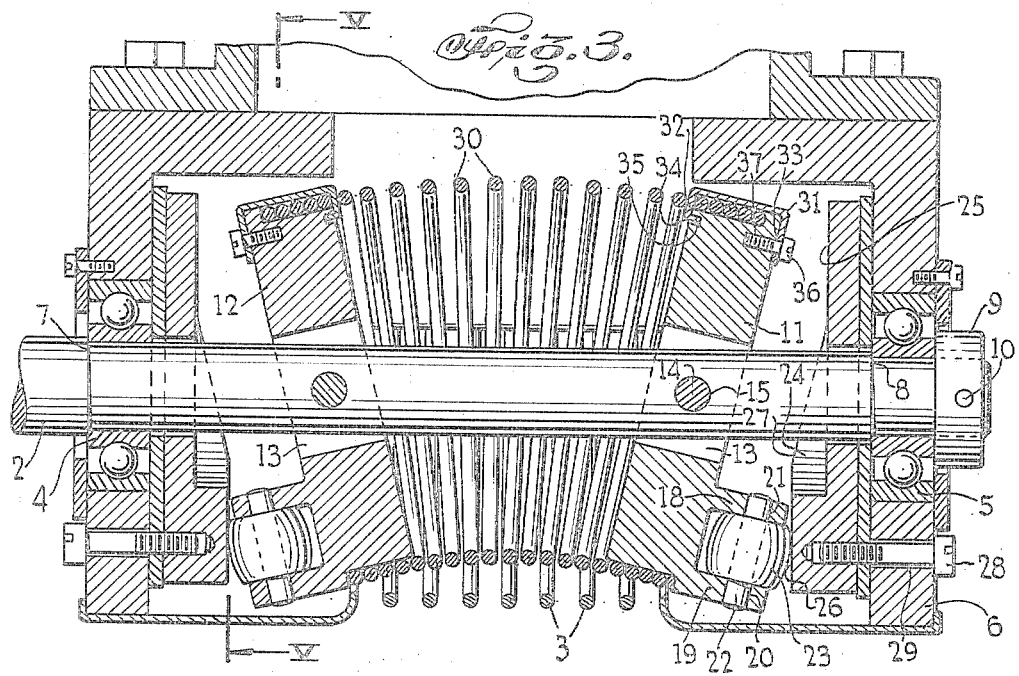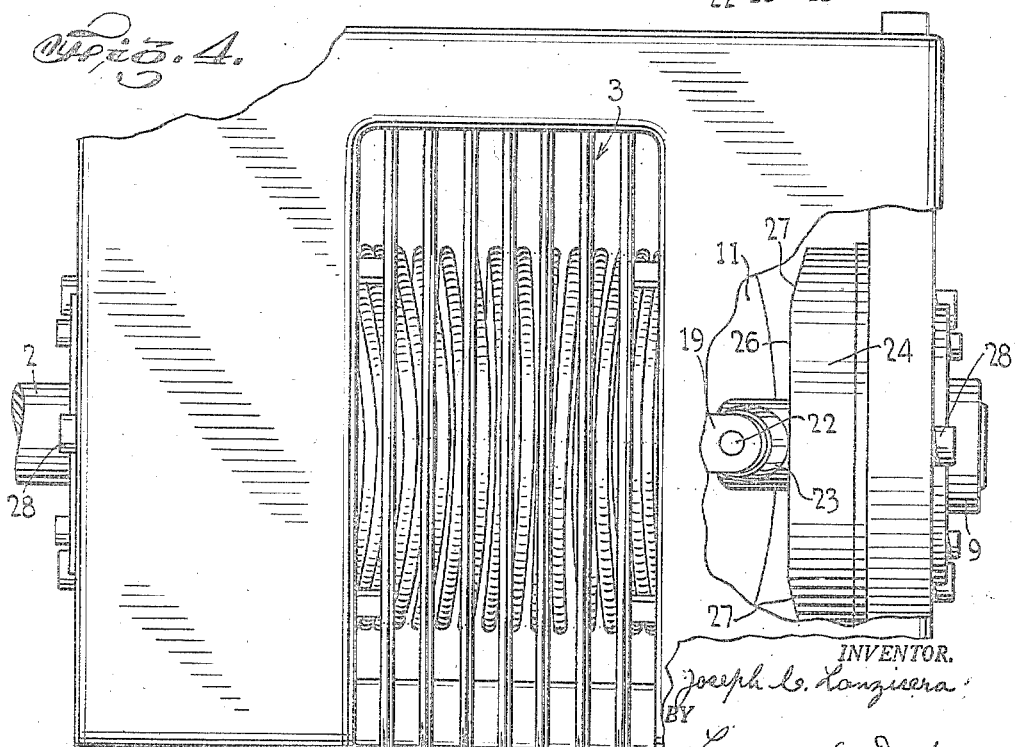

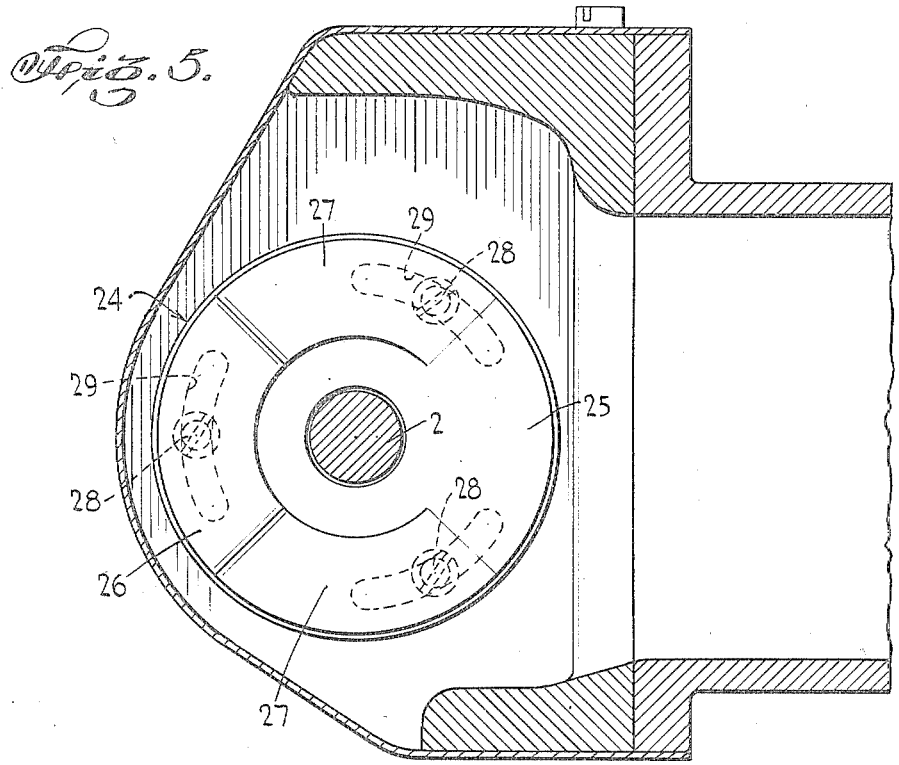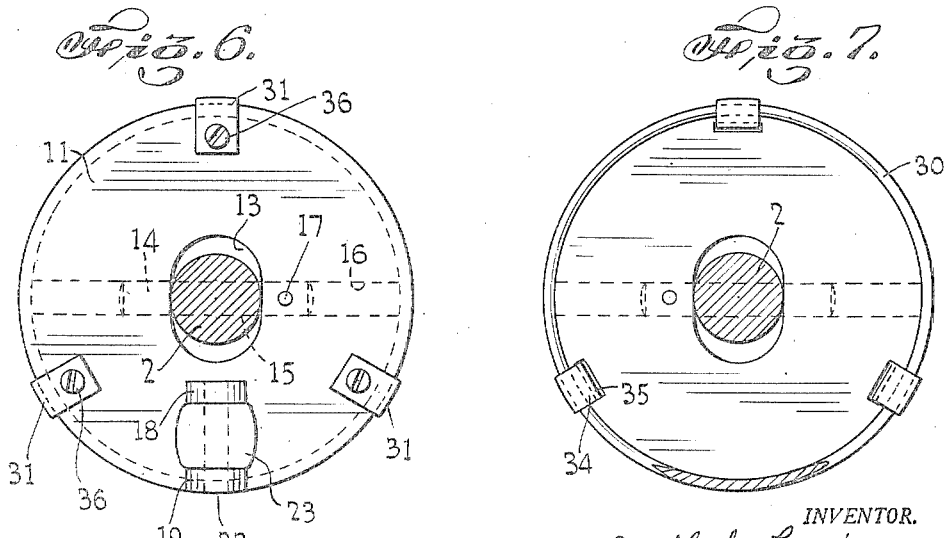

2,496,223

UNITED STATES PATENT OFFICE 2,496,223

POULTRY PLUCKER

Joseph C. Lanzisera, Brooklyn, N. Y.

Application July 13, 1946, Serial No. 683,351

5 Claims. (Cl. 17—11.1)

This invention relates to butchering, particularly the butchering of feathered creatures, and especially to the plucking of feathered creatures, such as birds, as poultry and fowl, as chickens, ducks, geese and turkeys.

A principal object of this invention is to provide a device by which feathered creatures, such as poultry may be cleaned of all their feathers, that is, plucked whether presently slaughtered or more remotely slaughtered.

A further object of the invention is the production of a device of the type specified by which plucking may be accomplished along a given zone of the body of a fowl quickly by a simple straight line motion of the fowl in one direction.

A further object of the invention is the production of a device of the type specified by which a fowl is plucked and the plucked feathers are removed from the zone of action of the operator immediately.

A further object of the invention is the production of a device of the type specified by which plucking of a fowl may be accomplished without tearing the skin of the fowl.

A further object of the invention is the production of a device of the type specified which will be substantially noiseless in operation.

Other objects and advantages will appear as the description of the particular physical embodiment selected to illustrate the invention progresses and the novel features will be particularly pointed out in the appended claims.

In describing the invention in detail and the particular physical embodiment selected to illustrate the invention, reference will be had to the accompanying drawings and the several views thereon, in which like characters of reference designate like parts throughout the several views, and in which:

Fig. 1 is a fragmentary, side elevational view, with some parts in section to more fully show the construction, of a machine embodying my invention; Fig. 2 is a fragmentary front elevational view of the machine embodying my invention; Fig. 3 is an enlarged fragmentary cross sectional view of the device as shown by Fig. 1 on the plane indicated by the line III—III; Fig. 4 is a fragmentary front elevational view of a portion of the machine drawn to a larger scale than that in Fig. 2 and with some parts broken away to more clearly show some of the internal construction; Fig. 5 is an enlarged fragmentary cross sectional view of the device as shown by Fig. 3 on the plane indicated by the line V—V of Fig. 3; Fig. 6 is a view of one side of a spring actuator used in my device; Fig. 7 is a face view of the other side of a spring actuator used in my device; Fig. 8 is a cross sectional view illustrating the cross section of material used for forming a spring used in my invention; Fig. 9 is a cross sectional view illustrating another form of material used in making a spring as used in my invention.

Generally speaking, a source of motive power 1 drives a shaft 2 which rotates feather seizing devices positioned behind a grid 3. If a fowl is grasped adjacent the feet and moved upwardly in front of the grid 3 in a straight line, feathers will be removed from the fowl in a certain zone and all of the feathers may be removed by rotating the fowl on a vertical axis and passing is vertically up in front of and close to the grid 3.

The shaft 2 is shown in Fig. 3. It is supported in suitable bearings, as 4 and 5, positioned in the frame 6. The shaft is prevented from longitudinal movement in any suitable or appropriate manner, as by forming shoulders at 7 and 8, and positioning the collar 9 thereon which is pinned to the shaft by a pin 10.

Two identical, but reversely arranged, spring actuators 11 and 12 are positioned on the shaft 2. These actuators each have a somewhat elliptical orifice therethrough, as 13. This orifice is such that the spring actuator touches the shaft at the extremities of one diameter, but is spaced from the shaft at two diametrically opposite points on the diameter at a right angle to the first mentioned diameter. Each spring actuator is attached to the shaft by a pin, as 14, which passes through the shaft through an orifice, as 15, therein and is seated in a through bore, as 16, formed in the spring actuator. The pin 14 is held in position by a pin, as 17.

Each of the spring actuators has an oscillator part attached thereto in any suitable or appropriate manner, the preferred manner being to form lugs, as 18 and 19, on one face of the actuator, orifice these lugs, as at 20 and 21, and place a pin, as 22, therein which bears a roller, as 23.

Roller 23 is positioned to abut against a suitable oscillating means, such as a cam 24. This cam is shown in Figs. 3 and 4, and has a lower face 25 and an upper face 26 connected by a sloping face 27. The cam is positioned so that the high point of the cam centers about on the vertical center of the grid 3, as shown in Fig. 2. The cams are attached to the frame 6 by screws, as 28, shown in section in Fig. 3 and in elevation in Fig. 5. The screws 28 pass through orifices, as 29, in the frame 6 and these orifices are made as slots so that the cam may be adjusted rotatively about the axis of the shaft 2 so as to position it accurately at the position desired.

Between the spring actuators is positioned a helically wound spring 30, best shown in Fig. 3. The end convolutions of the spring 30 rest on the peripheries of the spring actuators. They may be attached in any suitable or appropriate manner as by welding to the actuators, or, preferably by clamping thereto by spring clamps as 31, which engage several convolutions of the spring 30 and also engage each face of a spring actuator, as at 32 and 33. Preferably spring clamps 31 have a protruding portion 34 which seats in a cavity 35 in one face of a spring actuator and are held in place on the other face by a screw 36 screw-threaded into a screw-threaded orifice 37 formed in the spring actuator. I prefer to use about three of these spring clamps as best shown in Figs. 6 and 7.

When the shaft 2 is rotated it carries the pins 14 with it and so causes the spring actuators 11 and 12 to rotate. As the spring actuators 11 and 12 rotate, the rollers 23 engage the cams 24 and are oscillated back and forth so that the spring actuators are oscillated back and forth as they rotate. This oscillation causes the convolutions of the spring 30 to, at times, be separated on one side of the shaft 2 and to be brought closer together on the other side, all as clearly illustrated in Fig. 3. The cams are so placed that the convolutions of the spring adjacent the grid 3 start to approach each other as they pass the grid 3, beginning at the top and rotating downwardly in front of the grid 3. The maximum approach of the convolutions is caused to extend from a point in the revolution of the shaft 2 and the spring 30 from a desired point somewhat above the vertical center line of grid 3 to about the same distance below the center line, that is through a predetermined angular rotation of shaft 2, so that if a fowl is held with its legs pointing vertically upward and is pressed against the grid 3 and drawn upwardly while being pressed against the grid 3, the feathers protruding through the grid 3 will be engaged and grasped by adjacent convolutions of the spring 30 and plucked from the fowl.

In order to insure that the feathers will protrude through the grid 3 in position to be grasped by the convolutions of spring 30, I provide an exhaust fan 38, as indicated in Fig. 1, which connects with the interior of frame 6, draws air through grid 3, and exhausts through duct 39 into a convenient receptacle 40.

As best shown in Fig. 3, the grid wires 3 are preferably spaced about 5/16 of an inch apart and preferably are positioned about 1/16 of an inch from the center line of the squeezed together convolutions of the spring 30 so that even the smallest pin feathers projecting through the grid 3 may be seized, held and removed by the spring 30. In order that these very fine feathers may be seized and removed, I provide my dimensions such that the convolutions of the spring 30 when closest together in front of the grid 3 will only be separated by about 0.002 of an inch.

The spring 30 is illustrated in Fig. 3 as being formed of wire round in cross section. This operates quite well, but in Fig. 8 I have illustrated another form of wire which is somewhat oblong or elliptical in cross section, and in Fig. 9 I have illustrated a wire which in cross section is right angled at the corners being either square or rectangular. The wire of Fig. 9 probably exercises the surest grip on a feather.

The motor 1 is used to drive the shaft 2 by the belt drive 41 and the exhaust fan 38 by means of gears as 42 and 43.

The device as hereinbefore described may be driven at a very high speed, say 1000 revolutions per minute without undue vibration or noise so that it is suitable for use in retail establishments where unplucked fowl are sold and dry plucked on the premises. The waste is easily taken care of by receptacles 40 which may be removed when filled and replaced by a fresh receptacle which are somewhat like the ordinary dust-collecting bag on an ordinary household vacuum cleaner or conventionally used burlap bag.

The machine is very efficient in removing feathers because when a feather is grasped by the spring 30 it is pulled downwardly for perhaps one-half an inch while the flesh surrounding the feather is sustained by resting against the bars of the grid 3 so that the sudden pull nicely dislodges the feather without tearing the flesh of the fowl.

Although I have particularly described one particular physical embodiment of my invention, nevertheless, I desire to have it understood that the form selected is merely illustrative and does not exhaust the possible physical embodiments of the idea of means underlying my invention.

What I claim as new and desire to secure by Letters Patent is:

1. A device for plucking feathers from feather-bearing animals, including, in combination: a casing, said casing formed with an opening; a grid positioned over the opening; means for causing a flow of air through the opening past the grid; a receptacle into which the current of air passes; a helical spring positioned within the casing closely adjacent the grid; means to rotate the helical spring on its longitudinal axis; and means to cause the convolutions of the spring to approach closely one another in the portion passing the grid and to recede from one another at a position about 180° therefrom whereby a fowl presented to the grid may have its feathers drawn into the casing, seized by the helical spring and withdrawn from the fowl.

2. A device for plucking feathers from feather-bearing animals, including, in combination: a shaft mounted for rotation; means for driving the shaft; a helically coiled wire; means for attaching the ends of the wire to the shaft so that the wire will rotate in unison with the shaft; means for compressing convolutions of the helix during a predetermined angular portion of the rotation while simultaneously separating the convolutions at 180° therefrom, a casing enclosing the said means and the helix, said casing formed with an opening; a grid positioned over the opening of the casing, and with its vertical center midway of the said angular portion in which the convolutions of the helix are compressed and means to create an air draft through the grid and the helix whereby a fowl may be presented to the grid and the feathers thereon be drawn through the grid by the draft of air and seized by the helix and pulled from the fowl.

3. In a device for plucking feathers from feather-bearing animals, including, in combination: a shaft, means for driving the shaft; two members each formed with an orifice through which the shaft may pass, which orifice is of such dimensions that each member may oscillate relatively to the shaft; pins, one for each of said members, each of which pins passes through the shaft and into a member forming an oscillation pivot for the member; a helically wound spring surrounding the shaft and extending between the said members and attached to each member; means for oscillating the said members as the shaft rotates whereby the convolutions of the spring on one side thereof are brought close together during a predetermined angular portion of the rotation of the shaft, a grid positioned closely adjacent the portion of travel of the spring in which the convolutions are compressed and means for creating a draft of air over the grid and through the spring whereby a fowl presented to the grid may have its feathers plucked by reason of their being projected through the grid by the draft of air and being seized by the compressed convolutions of the spring.

4. A device for plucking feathers from feather-bearing animals, including, in combination: a helical spring formed of convolutions, means to rotate the spring and means including cams to compress the spring on one side and to open it on the other and means causing the feathers of a fowl held adjacent to the rotating spring to be projected between the spring convolutions whereby they are seized by the spring and plucked from the fowl.

5. A device for plucking feathers from feather-bearing animals, including, in combination: a casing formed with an opening; a grid covering the opening; bearings supported by the casing; a shaft journaled in the bearings for rotation; a cam surrounding the shaft on one side of the casing and a cam surrounding the shaft on the other side of the casing; an actuator, said actuator formed with a central, somewhat oblong, orifice positioned on the shaft adjacent one of the cams; a pin passed through the shaft and into the actuator whereby the actuator rotates with the shaft and may oscillate by reason of the oblong orifice therein, said actuator formed with a protuberance upon one side thereof positioned to cooperate with the adjacent cam whereby, as the actuator rotates, it is oscillated; another actuator spaced from the first actuator and positioned adjacent the cam on the other side of the casing, said second actuator also formed with an oblong orifice therethrough receiving the shaft and a pin passing through the shaft and into the actuator whereby the actuator is driven by the shaft and may oscillate by reason of the oblong orifice therein, said second actuator having a protuberance thereon positioned to operate with the adjacent cam whereby the actuator is oscillated as the shaft rotates; wire in the form of a helix surrounding the shaft and extending from one actuator to the other actuator and having its ends attached to the actuators whereby when the actuators are forced toward each other at one side by the adjacent cams, convolutions of the helically wound wire are caused to closely approach one another during the course of the rotation as determined by the shape of the cams, said convolutions when closely compressed together lying closely adjacent to said grid and means for causing a draft of air through the grid and over the helically wound wire whereby feathers on a fowl presented to the grid are drawn through the grid and seized by the closely spaced convolutions of the helically wound wire and pulled from the fowl.

JOSEPH C. LANZISERA.

REFERENCES CITED

The following references are of record in the file of this patent:

UNITED STATES PATENTS

| Number | Name | Date |
|---|---|---|
| 1,791,843 | Reiss | Feb. 10, 1931 |
| 1,875,980 | Bingham | Sept. 6, 1932 |
| 2,206,731 | Schlicksupp | July 2, 1940 |